(12) United States Patent
Qu (10) Patent No.: US 9,569,716 B2
(45) Date of Patent: Feb. 14, 2017

(54) SYSTEM AND METHOD FOR DISTRIBUTING AUDIO-BASED DATA TAGS

(71) Applicant: Lidong Qu, Beijing (CN)

(72) Inventor: Lidong Qu, Beijing (CN)

(73) Assignee: Lidong Qu, Beijing (CN)

( * ) Notice: Subject to any disclaimer, the term of this patent is extended or adjusted under 35 U.S.C. 154(b) by 0 days.

(21) Appl. No.: 14/418,886

(22) PCT Filed: Sep. 16, 2014

(86) PCT No.: PCT/CN2014/086606
§ 371 (c)(1),
(2) Date: Jan. 30, 2015

(87) PCT Pub. No.: WO2015/106576
PCT Pub. Date: Jul. 23, 2015

(65) Prior Publication Data
US 2016/0314391 A1 Oct. 27, 2016

(30) Foreign Application Priority Data
Jan. 20, 2014 (CN) .......................... 2014 1 0026089

(51) Int. Cl.
*G06K 7/00* (2006.01)
*G06K 19/07* (2006.01)
(Continued)

(52) U.S. Cl.
CPC ............ *G06K 19/0723* (2013.01); *G06F 3/16* (2013.01); *G06F 17/30026* (2013.01)

(58) Field of Classification Search
CPC .. G10L 19/018; G10L 19/02; G06F 17/30743; G06F 17/30017; G06F 17/30749; H04N 21/42203; H04N 21/4394; H04N 1/32122; G11B 20/00891; H04B 11/00; H04H 2201/05
See application file for complete search history.

(56) References Cited

U.S. PATENT DOCUMENTS

4,186,273 A * 1/1980 Dodson ................. H03G 9/025
381/28
8,249,559 B1 * 8/2012 Meiss ................ G06Q 30/0267
455/412.1
(Continued)

*Primary Examiner* — Christle I Marshall
*Assistant Examiner* — Asifa Habib
(74) *Attorney, Agent, or Firm* — SV Patent Service (57) ABSTRACT

The present invention relates to a system and method for distributing audio based data tags in the field of computer technologies. The system includes an audio processing device, an audio playing device, a user terminal, and a data tag server. In the disclosed method, the audio processing device associates a data tag in an audio to produce an associated audio. The audio playback device plays the associated audio as background music. The user terminal identified the associated audio in the background music and acquires associated data tag through a computer network. In the disclosed system and method, an audience can obtain product information from background music while enjoying music. The customers can thus quickly access to a large amount of product information. The disclosed audio based data tags distribution system has a simple structure and is widely applicable. The disclosed method can be easily implemented at low cost.

22 Claims, 4 Drawing Sheets (51) Int. Cl.
*G06F 17/30* (2006.01)
*G06F 3/16* (2006.01)

(56) References Cited

U.S. PATENT DOCUMENTS

| | | | |
|---|---|---|---|
| 2006/0174348 A1* | 8/2006 | Rhoads | G06F 17/30017 726/26 |
| 2007/0286358 A1* | 12/2007 | Pomerantz | G10L 15/22 379/67.1 |
| 2008/0027734 A1* | 1/2008 | Zhao | G10L 19/018 704/502 |
| 2008/0262928 A1* | 10/2008 | Michaelis | G06Q 30/02 705/14.26 |
| 2014/0142958 A1* | 5/2014 | Sharma | G10L 19/018 704/500 |

* cited by examiner

SYSTEM AND METHOD FOR DISTRIBUTING AUDIO-BASED DATA TAGS

BACKGROUND OF THE INVENTION

The invention relates to the computer technologies, and in particular, to audio processing technologies and to a system and method for creating, distributing, and utilizing audio based data tags.

In fashion and product launch shows, when models demonstrate clothing or products on stage, the audience has a real need to obtain better understanding of the clothing or products. The background commentary is usually not intuitive or specific enough for the audience to grasp all the product information. The product information on the display screen also does not allow audience to concentrate on the demonstration and performances of the models. Therefore, a long-felt need exists for allowing the audience to obtain comprehensive fashion or product information while without interfering with enjoying the performance and demonstration.

Similarly, in large retail stores and shopping malls, every store hopes passing customer to pay more attention to its own products, and to convey as much product information to the customers as possible, which presents a major challenge to the sales staff. Although sales personnel can pass brochures and introduces product face to face with customers, the product information conveyed is often very limited and sales results are not effective. There is therefore also a need for timely passing a large amount of product information to customers.

Data tags that can be read by dedicated devices or programs can include NFC, RFID, bar codes, two-dimensional matrix code, and so on. In the present disclosure, data tags mainly refer to patterns of bar codes and two-dimensional codes that are transmitted over the computer networks.

DETAILED DESCRIPTION OF THE INVENTION

The present invention is aimed at overcoming the drawbacks in the conventional technologies and to associate data tags carrying information to be conveyed with one or more segments of audios. The associated audio data can include human indiscernible high frequency audio data in the background music, which can be detected and by smart phones and other computer devices of the users or audiences. The user devices can directly acquire the product information to be conveyed via a computer network without affecting users' enjoyment of music and performance. In this way, the disclosed system and method can quickly distribute product information to customers using audio based data tags.

To achieve the above described objectives, an audio based data tag distribution system is disclosed, which includes the following:

The system can include an audio processing device, an audio playback device, a user terminal, and a data tag server.

Among them, the audio processing device can associate one or more segments of original audio data with one or more data tags based on predefined rules to produce associated audio data, wherein the audio processing device is further configured to receive user-end audio data from a user terminal and to search the user-end audio data for one or more associated data tags. The audio playback device is connected with the audio processing device and can receive the associated audio data and to output an acoustic wave corresponding to the associated audio data. The user terminal includes a microphone, an acoustic digital processor connected with the microphone, and a network module connected with the acoustic digital processor, wherein the microphone is configured to receive the acoustic wave from the audio playback device, wherein the acoustic digital processor is configured to convert the acoustic wave received by the microphone to user-end audio data, wherein the network module is connected with the audio processing device through a computer network and is configured to transmit the user-end audio data to the audio processing device, wherein the user terminal is configured to obtain information corresponding to the one or more data tags. The a data tag server connected with the audio processing device and the user terminal through a computer network and configured to receive information about the one or more data tags from the audio processing device and send the one or more data tags to the user terminal.

The audio processing device can include a high-frequency audio processor and a mixing processor.

The high-frequency audio processor can associate one or more sections of human indiscernible high frequency audio data with one or more data tags, the high-frequency audio processor being configured to receive the user-end audio data and to search for one or more data tags in the user-end audio data. The mixing processor is connected with the high-frequency audio processor and can mix the human indiscernible high frequency audio data with pre-stored human discernible audio data to produce the associated audio data.

In the audio based data tag distribution system, the data the human indiscernible high frequency audio data can be a frequency range from 16 kHz to 20 kHz.

In the audio based data tag distribution system, the human indiscernible high frequency audio data can include multiple sections characterized by different frequencies.

In the audio based data tag distribution system, the audio frequency processing device can include an audio segmentation processor that can segment audio data into multiple segments and associate one or more data tags with each of the multiple sections of the audio data to produce the associated audio data. The audio segment processor can receive the user-end audio data and to search for one or more data tags based on the user-end audio data.

In the audio based data tag distribution system, the audio segmentation processor can segment the audio data according to syllables in the audio data.

The audio based data tag distribution system can further include a wireless network access device configured to wireless communicate with the audio processing device, the user terminal, and the data tag server.

In the audio based data tag distribution system, the wireless network access device is configured to communicate in wireless signals based on 2G, 3G, or 4G wireless communication protocols. Moreover, the wireless network access device is a wireless router configured to communicate in WiFi wireless signals.

In the audio based data tag distribution system, the wireless network access device can be characterized by a device identification code for a location of the wireless network access device, wherein the wireless network access device can receive the user-end audio data from the user terminal and to send the user-end audio data and the device identification code to the audio processing device, wherein the audio processing device can determine whether the user terminal is wirelessly connected to the wireless network access device and to determine a position of the user terminal by identifying the device identification code, wherein the audio frequency processing device can search for the one or more data tag in the user-end audio data if the user terminal is connected to the wireless network access device.

In the audio based data tag distribution system, the audio playing device can include a power amplifier and a speaker, wherein an input of the power amplifier is connected to an output of the audio processing device, wherein an output of the power amplifier is connected to an input of the speaker.

The present invention also provides an audio based data tag distribution method compatible with the disclosed audio based data tag distribution system. The method can include the following:

1) associating one or more segments of original audio data with one or more data tags based on predefined rules by the audio processing device to produce associated audio data;

2) receiving the associated audio data from the audio processing device by an audio player device to output an acoustic wave corresponding to the associated audio data;

3) receiving the acoustic wave output by the audio playback device by a microphone in a user terminal; and converting the acoustic wave to user-end audio data by an acoustic digital processors;

4) transmitting the user-end audio data to the audio processing device by a network module in the user terminal;

5) searching for one or more data tags in the user-end audio data by the audio frequency processing device; and sending information about the one or more data tags to a data tag server;

6) receiving information about the one or more data tags from the audio processing device by the data tag server; and sending the one or more data tags from the data tag server to the user terminal; and 7) obtaining information from the one or more data tags received from the data tag server by the user terminal; and acquiring data associated with the one or more data tags.

In the computer-implemented method for distributing audio-based data tags, the audio frequency processing device comprises a high-frequency audio processor and a mixing processor, step (1) can include:

11-1) associating one or more sections of human indiscernible high frequency audio data with one or more data tags by the high-frequency audio processor;

11-2) mixing, by the mixing processor, the human indiscernible high frequency audio data with pre-stored human discernible audio data to produce the associated audio data.

In the computer-implemented method for distributing audio-based data tags, step 5) can include:

51) receiving the user-end audio data by the high audio processor; searching for one or more data tags in the user-end audio data; and sending information about the one or more data tags to the data tag server.

In the computer-implemented method for distributing audio-based data tags, the human indiscernible high frequency audio data can be in a frequency range from 16 kHz to 20 kHz.

In the computer-implemented method for distributing audio-based data tags, the human indiscernible high frequency audio data comprise multiple sections characterized by different frequencies.

In the computer-implemented method for distributing audio-based data tags, the audio processing device can include an audio segmentation processor, step 1) can include:

12) segmenting the audio data into multiple segments; and associating one or more data tags with each of the multiple sections of the audio data to produce the associated audio data.

In the computer-implemented method for distributing audio-based data tags, step 5) can include:

52) receiving the user-end audio data by the audio segment processor; searching for one or more data tags based on the user-end audio data; and transmitting information about the one or more data tags to the data tag server.

In the computer-implemented method for distributing audio-based data tags, the audio segmentation processor can segment the audio data according to syllables in the audio data.

In the computer-implemented method for distributing audio-based data tags, the system can also include a wireless network access device configured to wirelessly communicate with the audio processing device, the user terminal, and the data tag server, wherein step 4) can include:

41) sending the user-end audio data from the network module in the user terminal via the wireless network access device to the audio processing device;

and step 6) can include:

61) receiving information about the one or more data tags by a data tag server from the audio processing device; and sending the one or more data tags from the data tag server to the user terminal via the wireless network access device.

In the computer-implemented method for distributing audio-based data tags, the wireless network access device can be characterized by a device identification code representing a location of the wireless network access device, wherein step 41) can include:

41-1) receiving user-end audio data by the wireless network access device from the user terminal; and sending the user-end audio data and the device identification code to the audio processing device; and 41-2) determining, by the audio processing device, whether the device identification code received is the same as a device identification code of the wireless network access device before step 5); if not exit the method.

In the computer-implemented method for distributing audio-based data tags, the audio playback device can include a power amplifier and a speaker, the step (2) can include:

2-1) receiving the associated audio data from the audio processing device by the power amplifier; and amplifying the associated audio data; and 2-2) outputting an acoustic wave based on the amplified associated audio data.

In the disclosed system and method for distributing audio based data tags, the system can include an audio processing device, an audio playback device, a user terminal, and a data tag server. The audio processing device can associate one or more segments of audio data with one or more data tags. The audio playback device can play associated audio data as background music. A user can use a mobile phone or a tablet computer to identify the background music and send the user-end audio data to the audio processing device, which can find the corresponding data tag information. The data tag server sends the corresponding data tag to the user terminal, and then the user terminal can further acquire detailed product information embedded in the data tag. The disclosed system and method enable associated audio data to be played in a background music which allows audience to directly and quickly obtain comprehensive product information without interfering with enjoyment of music or performance. Moreover, the disclosed audio based data tags distribution system has a simple structure and can be widely applicable. The disclosed method can also be easily implemented at low cost.

IMPLEMENTATION EXAMPLES OF THE INVENTION

Technical content of the presently disclosed system and method can be better understood using the following detailed implementation examples.

Figure 1:
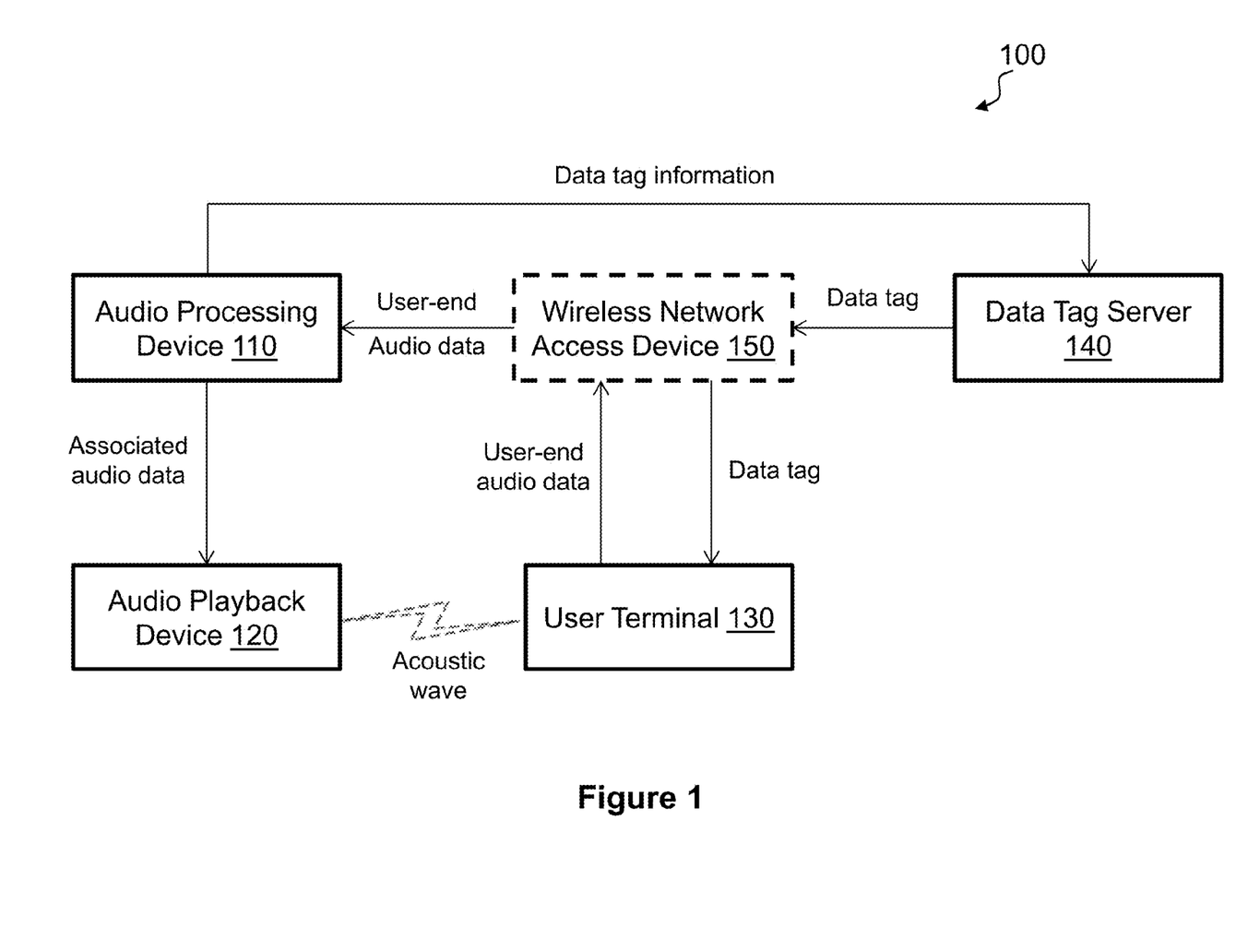
FIG. 1 is a schematic diagram showing the structure of the disclosed system for distributing audio based data tags.

FIG. 1 shows a system block diagram for an audio based data tag distribution system 100 in accordance with the present invention.

In some embodiments, the audio based data tag distribution system 100 includes an audio processing device 110, an audio playback device 120, a user terminal 130, and a data tag server 140.

Among them, the audio processing device 110 can associate one or more segments of original audio data with one or more data tags based on predefined rules to produce associated audio data. The audio processing device 110 can also receive user-end audio data from a user terminal 130 and to search for the user-end audio data for one or more associated data tags. The audio playback device 120 is connected with the audio processing device 110 and can receive the associated audio data and to output an acoustic wave corresponding to the associated audio data. The user terminal 130 includes a microphone, an acoustic digital processor connected with the microphone, and a network module connected with the acoustic digital processor. The microphone on the user terminal 130 can receive the acoustic wave from the audio playback device 120. The acoustic digital processor can convert the acoustic wave received by the microphone to user-end audio data. The network module is connected with the audio processing device 110 through a computer network and is configured to transmit the user-end audio data to the audio processing device 110. The user terminal 130 can obtain information corresponding to the one or more data tags. The data tag server 140 is connected with the audio processing device 110 and the user terminal 130 through a computer network and can receive information about the one or more data tags from the audio processing device 110 and send the one or more data tags to the user terminal 130.

Figure 2:
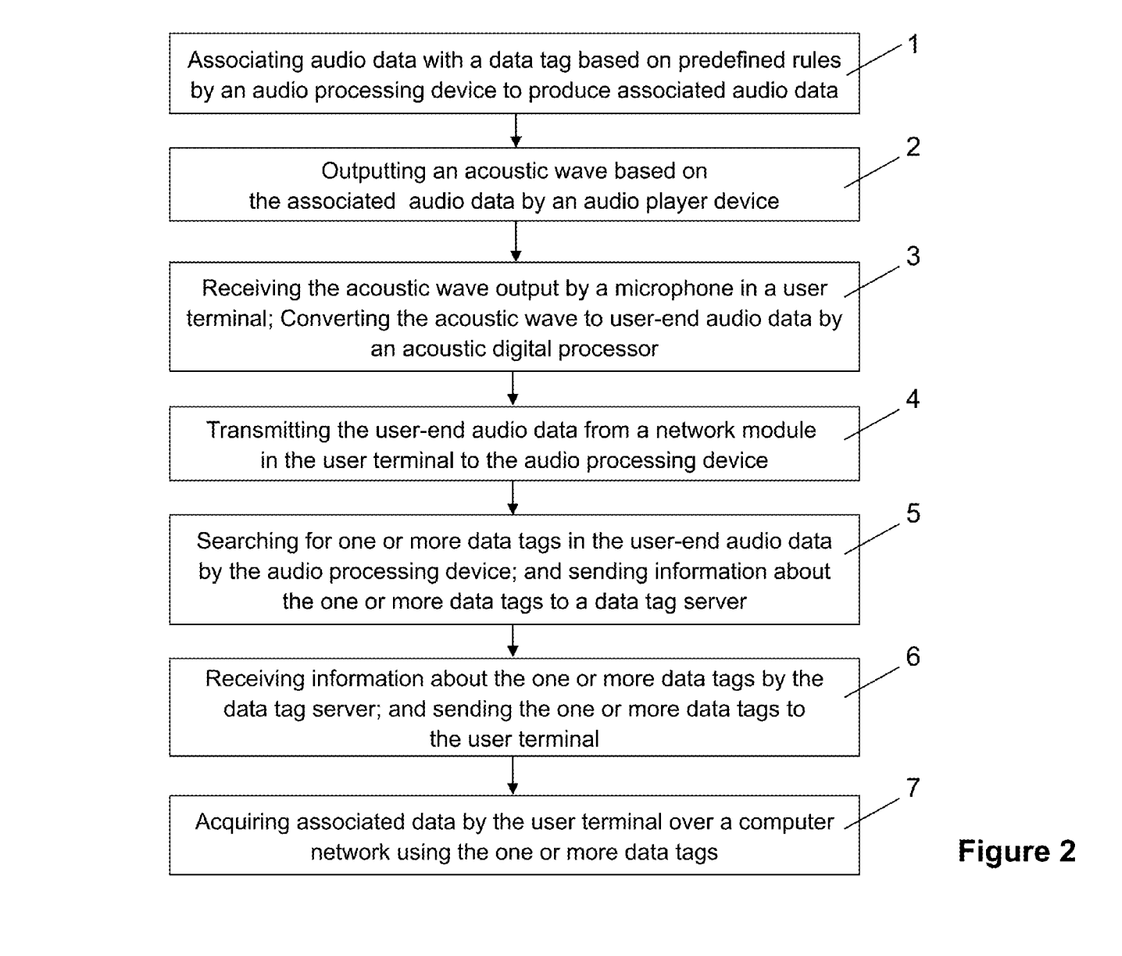
FIG. 2 is a flow diagram for the disclosed method for distributing audio based data tags.

FIG. 2 shows a flowchart for the disclosed audio based data tag distribution method, including the following steps:

1) associating one or more segments of original audio data with one or more data tags based on predefined rules by the audio processing device to produce associated audio data;

2) receiving the associated audio data from the audio processing device by an audio player device to output an acoustic wave corresponding to the associated audio data;

3) receiving the acoustic wave output from the audio playback device by a microphone in a user terminal; and converting the acoustic wave to user-end audio data by an acoustic digital processor;

4) transmitting the user-end audio data from a network module in the user terminal to the audio processing device;

5) searching for one or more data tags in the user-end audio data by the audio frequency processing device; and sending information about the one or more data tags to a data tag server;

6) receiving information about the one or more data tags from the audio processing device by the data tag server; and sending information about the one or more data tags from the data tag server to the user terminal; and 7) the user terminal uses the one or more data tags received from the data tag server to acquire associated data over a computer network.

In some embodiments, the audio frequency processing device can include a high-frequency audio processor and a mixing processor.

Specifically, the high-frequency audio processor can associate one or more sections of human indiscernible high frequency audio data with one or more data tags, the high-frequency audio processor being configured to receive the user-end audio data and to search for one or more data tags in the user-end audio data. The mixing processor is connected with the high-frequency audio processor and can mix the human indiscernible high frequency audio data with pre-stored human discernible audio data to produce the associated audio data. The data the human indiscernible high frequency audio data can be a frequency range from 16 kHz to 20 kHz. The human indiscernible high frequency audio data can include multiple sections characterized by different frequencies.

In the disclosed audio based data tag distribution method, step (1) can include:

11-1) the high-frequency audio processor can associate one or more sections of human indiscernible high frequency audio data with one or more data tags;

11-2) the mixing processor can mix the human indiscernible high frequency audio data with pre-stored human discernible audio data to produce the associated audio data.

Moreover, step (5) can include the following specific steps of:

51) the high audio processor receives the user-end audio data and search for one or more data tags in the user-end audio data; and sending information about the one or more data tags to the data tag server.

In some embodiments, the audio frequency processing device can include an audio segmentation processor that can segment audio data into multiple segments and associate one or more data tags with each of the multiple sections of the audio data to produce the associated audio data. The audio segment processor can receive the user-end audio data and to search for one or more data tags based on the user-end audio data. The audio segmentation processor can segment the audio data according to syllables in the audio data.

In the computer-implemented method for distributing audio-based data tags, step 1) can include:

12) segmenting the audio data into multiple segments; and associating one or more data tags with each of the multiple sections of the audio data to produce the associated audio data.

Furthermore, step 5) can include:

(52) receiving the user-end audio data by the audio segment processor;

searching for one or more data tags based on the user-end audio data; and transmitting information about the one or more data tags to the data tag server.

Referring back to FIG. 1, an audio based data tag distribution system 100 can further include a wireless network access device 150 configured to wireless communicate with the audio processing device 110, the user terminal 130, and the data tag server 140. In the audio based data tag distribution system 100, the wireless network access device 150 can communicate in wireless signals based on 2G, 3G, or 4G wireless communication protocols. Moreover, the wireless network access device 150 can include a wireless router that communicates in WiFi wireless signals.

In the computer-implemented method for distributing audio-based data tags, step 4) can include:

(41) sending the user-end audio data from the network module in the user terminal via the wireless network access device to the audio processing device;

and step 6) can include:

61) receiving information about the one or more data tags by a data tag server from the audio processing device; and sending the one or more data tags from the data tag server to the user terminal via the wireless network access device.

In the audio based data tag distribution system, the wireless network access device can be characterized by a device identification code (such as wireless router SSID) for a location of the wireless network access device, wherein the wireless network access device can receive the user-end audio data from the user terminal and to send the user-end audio data and the device identification code to the audio processing device.

The audio processing device can include an analysis server for recognizing the device identification code. The analysis server can determine whether the user terminal is wirelessly connected to the wireless network access device, to determine a position of the user terminal. If it is, the audio frequency processing device can search for the one or more data tag in the user-end audio data.

In the computer-implemented method for distributing audio-based data tags, step 41) can include:

41-1) receiving user-end audio data by the wireless network access device from the user terminal; and sending the user-end audio data and the device identification code to the audio processing device; and 41-2) determining, by the audio processing device, whether the device identification code received is the same as a device identification code of the wireless network access device before step 5); if not exit the method.

In some embodiments, the audio playback device can include a power amplifier and a speaker. The input of the power amplifier is connected to the output of the audio processing device, wherein the output of the power amplifier is connected to an input of the speaker.

In the computer-implemented method for distributing audio-based data tags, the step (2) can include:

2-1) receiving the associated audio data from the audio processing device by the power amplifier; and amplifying the associated audio data; and 2-2) outputting an acoustic wave based on the amplified associated audio data.

Figure 3:
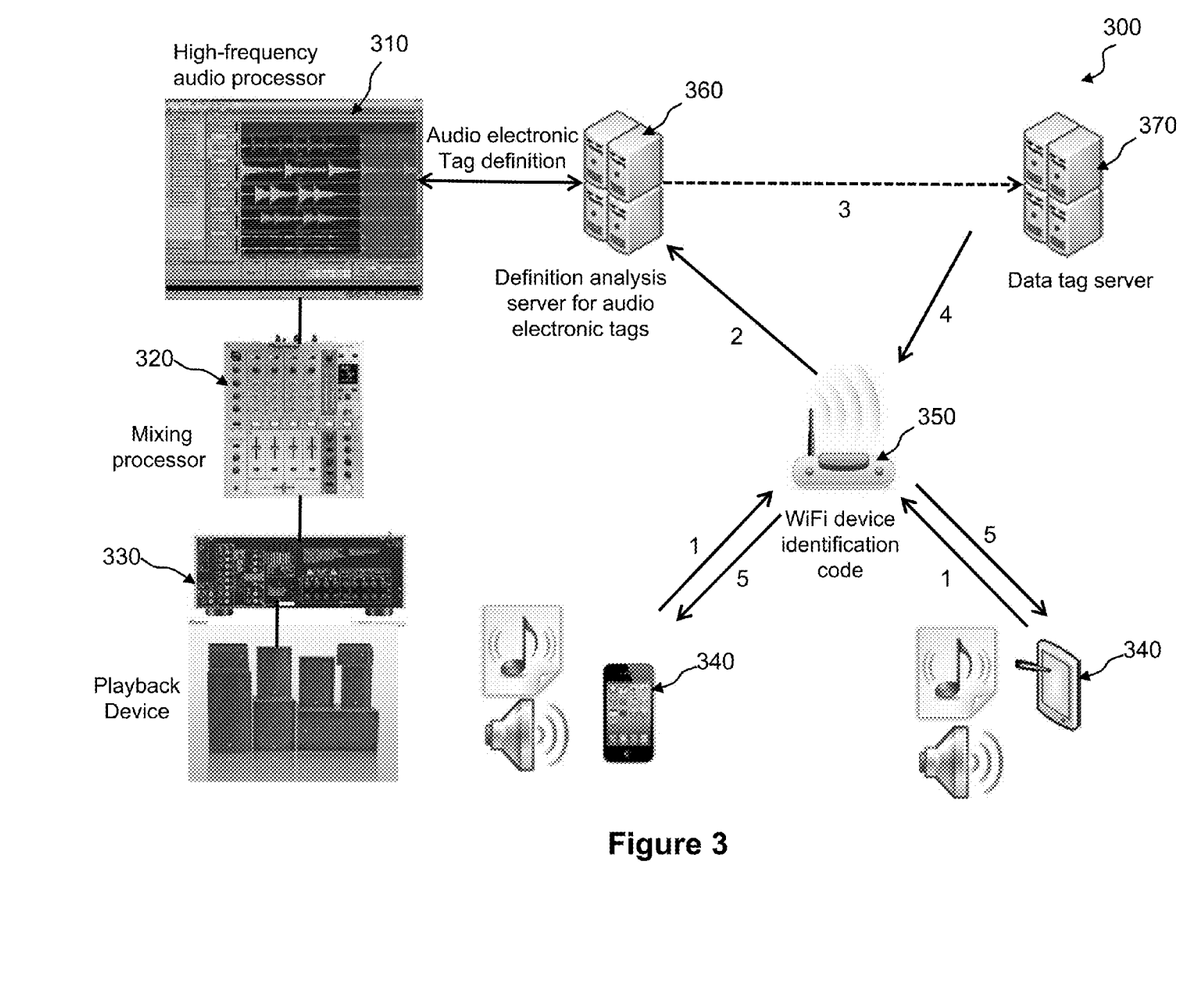
FIG. 3 is a schematic diagram showing an exemplified implementation of the disclosed system and method for distributing audio based data tags by inserting a high-frequency component in an original audio.
Figure 4:
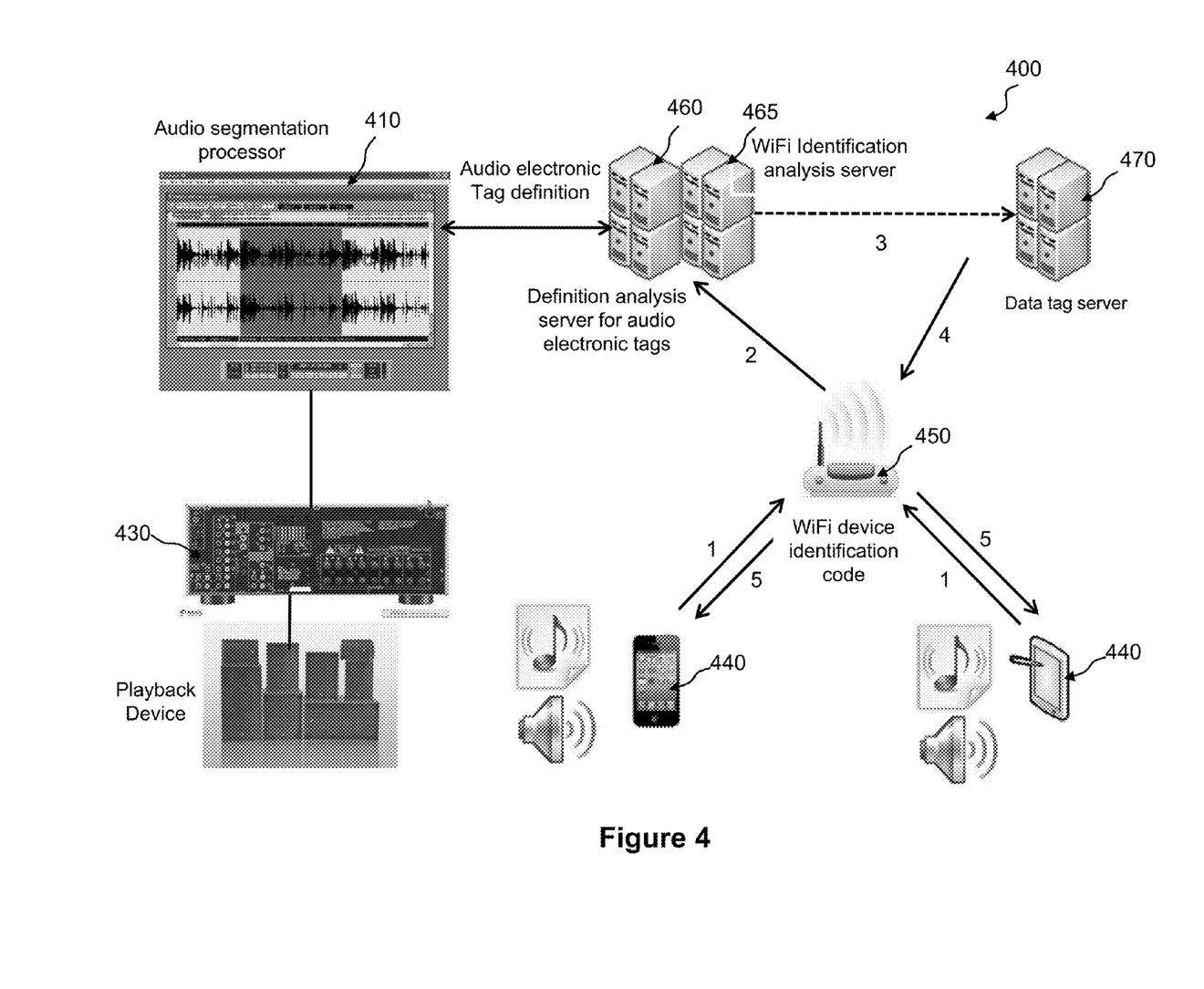
FIG. 4 is a schematic diagram showing an exemplified implementation of the disclosed system and method for distributing audio based data tags in multiple segments of background music.

In practical applications, the disclosed system and methods can be implemented with exemplified schemes as shown in FIGS. 3 and 4.

Scheme 1: an exemplified audio based data tag distribution system 300 is shown in FIG. 3. The audio based data tag distribution system 300 includes a high-frequency audio processor 310 and a mixing processor 320 which can produce audio electronic tag in a human indiscernible frequency range such as 16 kHz~20 kHz. Without affecting the sound effects and enjoyment of the music or songs by the audience, the audio electronic tag is played by a professional-grade playback device 330 transmitted to smart user terminals 340 through a WiFi network 350 (i.e. a wireless network access device). The data tag is obtained by Apps on the user terminals 340. The information associated with the data tag is displayed on the user terminals 340.

As researches have shown, professional audio systems can produce high frequency audio in a frequency range of 5 kHz~20 kHz. Microphones of smart user terminals, such as mobile phones and tablet computer can receive audio signals in a frequency range 20 Hz to 20 kHz.

Theoretically, human ears can discern audio signals in a frequency range from 20 Hz to 20 kHz, but in real life, human audible frequency range is about 90 Hz~15.1 kHz. As people age or due to other causes, audible frequency ranges can be far less than 90 Hz~15.1 kHz (especially in the high frequency end). As people age, as determined by their physiological structures, people's audible ranges decrease significantly.

The audio electronic tag can be embedded in audio signals in 16 kHz~20 kHz, which are indiscernible to human ears. The high-frequency audio processor 310 can first delete signals between 16 kHz and 20 kHz from an original audio. The mixing processor 320 then inserts audio electronic tags in 16 kHz~20 kHz into the rest portion of the original audio signal to produce an associated audio signal. The associated audio can then be played by a professional audio playback device 330, which allow listener to hear the music, songs, or sound effect in the original audio (while distributing associated data tags).

A dedicated definition/analysis server 360 can be used to analyze audio electronic tags in associated audio signals in accordance with definition of the audio electronic tags provided by the high-frequency audio processor 310. At the same time, intelligent user terminals 340 are installed with dedicated Apps. Microphones of the user terminals 340 can collect audio electronic tags in 16 kHz~20 kHz. The intelligent user terminals 340 then send the audio electronic tags via a WiFi network to the definition/analysis server 360, which extracts data tag information from the audio electronic tags. The data tag server 370 receives the data tag information from the definition/analysis server 360, obtains the corresponding data tag(s), and distributes the data tags to the user thermals 340, allowing users to obtain information (e.g. related to products and services) conveyed by the data tags.

Scheme 2: as shown in FIG. 4, an audio based data tag distribution system 400 includes an audio segmentation processor 410, a professional-grade playback device 430, user terminals 440, a WiFi network 450 (i.e. a wireless network access device), a definition/analysis server 460, a WiFi identification analysis server 465, and a data tag server 470. The audio segmentation processor 410 segments an original audio such as a piece of music, a song, or sound effect, into multiple segments and inserts an audio electronic tag into each segment to create associated audio signals in different segments. The playback device 430 plays the associated audio signal, which is picked by user terminals 440. The user terminals 440 sends to the audio electronic tags to the definition/analysis server 460 via the WiFi network 450 which is characterized by a device identification code (such as SSID). The device identification code can identify the identity as well as the location and the venue of the WiFi network 450. The WiFi network 450 sends the audio electronic tags from the user terminals 440 and the identification of the WiFi network 450 to the definition/analysis server 460 and the WiFi identification analysis server 465. The definition/analysis server 460 extracts data tag information from the audio electronic tags using definitions of the audio electronic tags provided by the audio segmentation processor 410. The location information is extracted by the WiFi identification analysis server 465. The data tag server 470 receives the data tag and location information and distributes one or more data tags to the user terminals 440 according to the locations of the WiFi network 450. The data tags and related information can then be obtained by and displayed on the user terminals 440.

The above described method determines location and place using a WiFi network (details about "determination of locations using identification codes of WiFi and other wireless network access equipment" are disclosed in Chinese patent application serial number 201310460760.6, titled "System and method for applying and processing data tag carriers".). Similarly, the disclosed method can use cellular (e.g. 3G or 4G) technologies, or a combination of WiFi and cellular technologies, to determine locations.

The presently disclosed invention can be widely used, such as in large retail stores and shopping centers. Each store can have its own WIFI network 450 and corresponding background music, songs, or sound effects. Customers can open a special purpose App on their intelligent terminals to connect to the WIFI network 450 and uses their microphones record segments of background music, songs, and sound effects. The audio electronic tags in the segments of background music, songs, and sound effects as well as location of the WiFi network 450 are sent to the definition/analysis server 460, which obtains data tag information in the audio electronic tag. The WiFi identification analysis server 465 identifies the WiFi network 450 and determines its location. The data tag server 470 pushes one or more data tags corresponding to the audio electronic tags in the backgrounds of different segments the original audio to the user terminals 440, which allows the users or customers to access, browse, and utilize information associated with the data tags.

In fashion and product launch shows, when models demonstrate clothing or products on stage, audience or customers can use their intelligent terminals 440 to open a specific App to connect to a WiFi network 450. The microphones on the intelligent user terminals can obtain audio electronic tags in segments of background music, songs, or sound effects. The audio electronic tags and location of the WiFi network 450 can be sent to and analyzed respectively by the definition/analysis server 460 and the WiFi identification analysis server 465. The data tag server 470 pushes one or more data tags corresponding to the audio electronic tags in the backgrounds of different segments the original audio to the user terminals 440, which allows the users or customers to access, browse, and utilize information associated with the data tags.

Of course, applications of the present invention are not limited to the specific examples above. Other suitable examples can include communications dialog and lyrics of operas and plays to the audience, or using background music and locations of the access points to communicate information about scenic spots, tours, and so on.

The present invention relates to a system and method for distributing audio based data tags. The system includes an audio processing device, an audio playing device, a user terminal, and a data tag server. The audio processing device associates one or more data tags containing information to be conveyed with one or more segments of an audio. The audio playback device plays the audio with the associated audio as background music. Users use terminals such as smart phones and tablets to recognize the background music and send user-end audio data to an audio processing device via a computer network. The audio processing device searches for associated data tag information and a data tag server sends data tags to the user terminals, which allows user terminals to acquire product information corresponding to the data tags. Using the disclosed system and method, an audience can obtain product information from background music while enjoying music. The customers can thus quickly access to a large amount of product information. The disclosed audio based data tags distribution system has a simple structure and is widely applicable. The disclosed method can be easily implemented at low cost.

In the present specification, the invention has been described using particular implementation examples. However, it should be obvious that configurations and steps can be varied without departing from the spirit and scope of the present invention. Therefore, the specification and drawings should be considered for illustrative but not restrictive, purpose.

What is claimed is:

1. An audio based data tag distribution system, comprising:
    an audio processing device configured to embed one or more segments of audio data with one or more data tags based on predefined rules to produce associated audio data, wherein the one or more data tags include a barcode or a two-dimensional code, wherein the audio processing device is further configured to receive user-end audio data from a user terminal and to search the user-end audio data for one or more data tags;
    an audio playback device connected with the audio processing device and configured to receive the associated audio data and to output an acoustic wave corresponding to the associated audio data;
    a user terminal, comprising:
        a microphone,
        an acoustic digital processor connected with the microphone, and
        a network module connected with the acoustic digital processor,
    wherein the microphone is configured to receive the acoustic wave from the audio playback device, wherein the acoustic digital processor is configured to convert the acoustic wave received by the microphone to user-end audio data, wherein the network module is connected with the audio processing device through a computer network and is configured to transmit the user-end audio data to the audio processing device, wherein the user terminal is configured to obtain the barcode or the two-dimensional code corresponding to the one or more data tags; and
    a data tag server connected with the audio processing device and the user terminal through a computer network and configured to receive the barcode or two-dimensional code corresponding to the one or more data tags from the audio processing device and send the barcode or the two-dimensional code corresponding to the one or more data tags to the user terminal.

2. The audio based data tag distribution system of claim 1, wherein the audio processing device comprises:
    a high-frequency audio processor configured to embed one or more sections of human indiscernible high frequency audio data with one or more data tags, the high-frequency audio processor being configured to receive the user-end audio data and to search for one or more data tags in the user-end audio data, wherein each of the one or more sections is characterized by a frequency that is not discernible by human ears; and a mixing processor connected with the high-frequency audio processor and configured to mix the human indiscernible high frequency audio data with pre-stored human discernible audio data to produce the associated audio data.

3. The audio based data tag distribution system of claim 2, wherein the human indiscernible high frequency audio data is a frequency range from 16 kHz to 20 kHz.

4. The audio based data tag distribution system of claim 2, wherein the human indiscernible high frequency audio data comprise multiple sections each characterized by a different frequency not discernible to human ears.

5. The audio based data tag distribution system of claim 1, wherein the audio frequency processing device comprises:

an audio segmentation processor configured to segment audio data into multiple segments and embed one or more data tags with each of the multiple sections of the audio data to produce the associated audio data, the audio segment processor being configured to receive the user-end audio data and to search for one or more data tags based on the user-end audio data, wherein each of the multiple sections is characterized by a different frequency not discernible to human ears.

6. The audio based data tag distribution system of claim 5, wherein the audio segmentation processor is configured to segment the audio data according to syllables in the audio data.

7. The audio based data tag distribution system of claim 1, further comprising:

a wireless network access device configured to wireless communicate with the audio processing device, the user terminal, and the data tag server.

8. The audio based data tag distribution system of claim 7, wherein the wireless network access device is configured to communicate in wireless signals based on 2G, 3G, or 4G wireless communication protocols.

9. The audio based data tag distribution system of claim 7, wherein the wireless network access device is a wireless router configured to communicate in WiFi wireless signals.

10. The audio based data tag distribution system of claim 7, wherein the wireless network access device is characterized by a device identification code representing a location of the wireless network access device, wherein the wireless network access device is configured to receive the user-end audio data from the user terminal and to send the user-end audio data and the device identification code to the audio processing device, wherein the audio processing device is configured to determine whether the user terminal is wirelessly connected to the wireless network access device and to determine a position of the user terminal by identifying the device identification code, wherein the audio frequency processing device is configured to search for the one or more data tags in the user-end audio data if the user terminal is determined to be connected to the wireless network access device.

11. The audio based data tag distribution system of claim 1, wherein the audio playing device comprises a power amplifier and a speaker, wherein an input of the power amplifier is connected to an output of the audio processing device, wherein an output of the power amplifier is connected to an input of the speaker.

12. A computer-implemented method for distributing audio-based data tags, comprising the steps of:

1) embedding one or more segments of audio data with one or more data tags based on predefined rules by an audio processing device to produce associated audio data, wherein the one or more data tags include of a barcode or a two-dimensional code;

2) receiving the associated audio data from the audio processing device by an audio player device to output an acoustic wave corresponding to the associated audio data;

3) receiving the acoustic wave output by the audio playback device by a microphone in a user terminal; and converting the acoustic wave to user-end audio data by an acoustic digital processors;

4) transmitting the user-end audio data from a network module in the user terminal to the audio processing device;

5) searching for one or more data tags in the user-end audio data by the audio frequency processing device; and sending the barcode or two-dimensional code corresponding to the one or more data tags to a data tag server;

6) receiving the barcode or two-dimensional code corresponding to the one or more data tags by the data tag server; and sending the one or more data tags from the data tag server to the user terminal; and 7) acquiring associated data by the user terminal over a computer network using the barcode or two-dimensional code corresponding to the one or more data tags received from the data tag server.

13. The computer-implemented method of claim 12, wherein the audio frequency processing device comprises a high-frequency audio processor and a mixing processor, wherein step 1) comprises:

11-1) embedding one or more sections of human indiscernible high frequency audio data with one or more data tags by the high-frequency audio processor, wherein each of the one or more sections is characterized by a frequency that is not discernible by human ears;

11-2) mixing, by the mixing processor, the human indiscernible high frequency audio data with pre-stored human discernible audio data to produce the associated audio data.

14. The computer-implemented method of claim 13, wherein step 5) comprises:

51) receiving the user-end audio data by the high audio processor;

searching for one or more data tags in the user-end audio data; and sending information about the one or more data tags to the data tag server.

15. The computer-implemented method of claim 13, wherein the human indiscernible high frequency audio data is in a frequency range from 16 kHz to 20 kHz.

16. The computer-implemented method of claim 15, wherein the human indiscernible high frequency audio data comprise multiple sections each characterized by a different frequency not discernible to human ears.

17. The computer-implemented method of claim 12, wherein the audio processing device includes an audio segmentation processor, wherein step 1) comprises:

12) segmenting the audio data into multiple segments; and embedding one or more data tags with each of the multiple sections of the audio data to produce the associated audio data, wherein each of the multiple sections is characterized by a different frequency not discernible to human ears.

18. The computer-implemented method of claim 17, wherein step 5) comprises:

52) receiving the user-end audio data by the audio segment processor;

searching for one or more data tags based on the user-end audio data; and transmitting information about the one or more data tags to the data tag server.

19. The computer-implemented method of claim 17, wherein the audio segmentation processor is configured to segment the audio data according to syllables in the audio data.

20. The computer-implemented method of claim 12, wherein a wireless network access device configured to wireless communicate with the audio processing device, the user terminal, and the data tag server, wherein step 4) comprises:

41) sending the user-end audio data from the network module in the user terminal via the wireless network access device to the audio processing device;

wherein step 6) comprises:

61) receiving information about the one or more data tags by a data tag server from the audio processing device; and sending the one or more data tags from the data tag server to the user terminal via the wireless network access device.

21. The computer-implemented method of claim 20, wherein the wireless network access device is characterized by a device identification code representing a location of the wireless network access device, wherein step 41) comprises:

41-1) receiving user-end audio data by the wireless network access device from the user terminal; and sending the user-end audio data and the device identification code to the audio processing device; and 41-2) determining, by the audio processing device, whether the device identification code is associated with the wireless network access device before step 5).

22. The computer-implemented method of claim 12, wherein the audio playing device comprises a power amplifier and a speaker, wherein step 2) comprises:

2-1) receiving the associated audio data from the audio processing device by the power amplifier; and amplifying the associated audio data; and 2-2) outputting an acoustic wave based on the amplified associated audio data.

* * * * *